(12) United States Patent
Nakamura et al.

(10) Patent No.: US 6,383,559 B1
(45) Date of Patent: May 7, 2002

(54) ANTI-REFLECTION FILM AND DISPLAY DEVICE HAVING THE SAME

(75) Inventors: Kazuhiro Nakamura; Tomokazu Yasuda; Taku Nakamura, all of Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/055,250

(22) Filed: Apr. 6, 1998

Related U.S. Application Data

(63) Continuation-in-part of application No. 08/760,458, filed on Dec. 6, 1996, now abandoned.

(30) Foreign Application Priority Data

| Dec. 7, 1995 | (JP) | 7-318825 |
| Feb. 22, 1996 | (JP) | 8-034661 |
| Apr. 4, 1997 | (JP) | 9-086176 |

(51) Int. Cl.⁷ .............. B32B 3/10; B32B 5/14; D06N 7/04; B05D 3/02; G02B 27/00
(52) U.S. Cl. ............ 427/180; 428/903; 428/327; 428/336; 428/421; 428/422; 428/308.4; 428/314.8; 428/315.7; 428/317.9; 428/318.4; 428/147; 427/385.5; 359/609
(58) Field of Search ................ 428/143, 147, 428/903, 327, 336, 421, 422, 308.4, 314.8, 315.7, 317.9, 318.4; 359/609, 586, 582; 427/180, 201, 203, 385.5

(56) References Cited

U.S. PATENT DOCUMENTS

| 4,271,210 A | 6/1981 | Yoldas | 427/169 |
| 4,446,171 A | 5/1984 | Thomas | 427/160 |
| 4,535,026 A | 8/1985 | Yoldas et al. | 428/310.5 |
| 4,652,467 A | 3/1987 | Brinker et al. | 427/246 |
| 4,769,306 A | 9/1988 | Oberhauser et al. | 430/220 |
| 4,830,879 A | 5/1989 | Debsikdar | 427/162 |
| 5,572,086 A | 11/1996 | Tong et al. | 313/478 |
| 5,909,314 A | * | 6/1999 | Oka et al. | 359/582 |

FOREIGN PATENT DOCUMENTS

| EP | 0402473 A1 | 12/1990 |
| EP | 0445686 A3 | 9/1991 |
| EP | 0445686 A2 | 9/1991 |
| EP | 0606493 A1 | 7/1994 |
| EP | 0656258 A2 | 6/1995 |
| EP | 0656258 A3 | 3/1998 |
| JP | 59-50401 | 3/1984 |
| JP | 2-245702 | 10/1990 |
| JP | 7-92305 | 4/1995 |
| JP | 7-168006 | 7/1995 |

OTHER PUBLICATIONS

European Search Report issued in European Application No. EP 96 11 9707.

* cited by examiner

Primary Examiner—Rena L. Dye
Assistant Examiner—Derek Jessen
(74) Attorney, Agent, or Firm—Burns, Doane, Swecker & Mathis, LLP

(57) ABSTRACT

An anti-reflection film comprises a low refractive index layer. The low refractive index layer comprises a polymer binder and micro particles. The micro particles are so deposited to superpose at least one micro particle on another micro particle, to form micro voids surrounded by the micro particles. The micro particles have a mean particle size of 5 to 200 nm. A display device provided with the anti-reflection film is also disclosed.

27 Claims, 2 Drawing Sheets

ANTI-REFLECTION FILM AND DISPLAY DEVICE HAVING THE SAME

CROSS-REFERENCE TO RELATED APPLICATION

This is a continuation-in-part application of U.S. patent application Ser. No. 08/760,458 filed on Dec. 6, 1996, now abandoned.

BACKGROUND OF THE INVENTION

1. Field of the Invention

The present invention relates to an anti-reflection film suitable for lowering reflection of light on a displaying surface of a display device, and relates to a display device provided with the anti-reflection film.

2. Description of Prior Art

As anti-reflection films for visible light, multi-layered films wherein plural transparent layers made of metal compounds (e.g., metal oxides) are superposed one on another have been employed. In the case that a monolayer film is employed instead of the multi-layered film, the monolayer film cannot effectively lower reflection of light having wide wavelength region (e.g., visible light), though the monolayer film can lower reflection of monochromatic light.

In the multi-layered film, increase of the number of the layers can enlarge a wavelength region of light to which the multi-layered film can apply. Therefore, the known anti-reflection film is the multi-layered film composed of two or more metal oxide layers which are deposited by means of deposition. However, formation of the multi-layered film requires a complicated process comprising a number of physical or chemical deposition procedures which correspond to the number of the metal compound layers having predetermined refractive index and thickness, under highly precise control of the thickness for each layer. Further, on the multi-layered film, a fluororesin layer is needed to be formed to improve stain resistance (e.g., resistance to formation of fingerprint onto the surface of the film).

Alternatively to the multi-layered film, it is known to use, as the anti-reflection film, a film in which refractive indices to air gradually vary in the thickness direction. Japanese Patent Provisional Publication No. 2(1990)-245702 describes an anti-reflection film comprising $MgF_2$ micro particles and $SiO_2$ micro particles having refractive index between those of glass and $MgF_2$, in which blending ratio of the $MgF_2$ micro particles and $SiO_2$ micro particles varies in the thickness direction. In more detail, the anti-reflection film is prepared by coating a liquid containing a mixture of the $MgF_2$ micro particles and $SiO_2$ micro particles on a glass plate to reduce a ratio of the $SiO_2$ micro particles to $MgF_2$ micro particles. Thus formed anti-reflection film shows a little variation of refractive indices between its bottom and the upper surface of the glass plate. Therefore, the anti-reflection film shows a high anti-reflection effect.

Japanese Patent Provisional Publication No. 5(1993)-13021 also describes an anti-reflection film comprising two layers of $MgF_2$ micro particles and $SiO_2$ micro particles dispersed in ethyl silicate, a first layer containing $MgF_2$ micro particles and $SiO_2$ micro particles at ratio of 7/3 and a second layer containing $MgF_2$ micro particles and $SiO_2$ micro particles at ratio of 1/1. The first layer has a refractive index of 1.42 and the second layer has a refractive index of 1.44. Thus, the anti-reflection film does not show a satisfactory anti-reflection effect.

Japanese Patent Provisional Publication No. 7(1995)-92305 describes an anti-reflection film which comprises polymer particles (e.g., refractive index: 1.428) composed of core and shell. The film has a structure composed of an uneven surface portion of a low refractive index comprising air and the polymer particles and a portion comprising only the polymer particles. The core is composed of copolymer of methyl methacrylate, methacrylic acid, trifluoroethyl acrylate and N-isobutoxymethyl acrylate, and the shell is composed of copolymer of styrene, acrylic acid and butyl acrylate.

Japanese Patent Provisional Publication No. 7(1995)-168006 describes an anti-reflection film which has a structure composed of an uneven surface portion of a low refractive index comprising air and particles (e.g., $MgF_2$), a portion (middle refractive index) comprising only the particles thereunder, and a portion comprising the particles and binder.

Japanese Patent Provisional Publications No. 2(1990)-245702, No. 5(1993)-13021, No. 7(1995)-92305 and No. 7(1995)-168006 mentioned above, all describe a film in which the refractive indices gradually vary in the thickness direction. However, the preparation of these films requires complicated procedures and skilled art, and further the films do not show a satisfactory anti-reflection effect.

SUMMARY OF THE INVENTION

It is an object of the invention to provide an anti-reflection film showing a high anti-reflection effect which can be prepared by a simple process.

It is further object of the invention is to provide an anti-reflection film having a low-refractive index layer which is improved in mechanical strength.

It is further object of the invention to provide an image display device provided with an anti-reflection film showing high anti-reflection effect which can be prepared by a simple process.

There is provided by the invention an anti-reflection film comprising a low refractive index layer which comprises a polymer binder and particles which are so deposited to superpose at least one micro particle on another micro particle, to form micro voids surrounded by the micro particles, said micro particles having a mean particle size of 5 to 200 nm.

Preferred embodiments of anti-reflection film of the invention are as follows:

1) The anti-reflection film wherein the particles are made of a fluorine-containing polymer (i.e., fluororesin), which preferably is a crystalline polymer.
2) The anti-reflection film wherein the particles are made of a fluorine-containing polymer, which contains a fluorine atom in an amount of not less than 0.30 weight fraction (preferably not less than 0.30 to 0.75 weight fraction, especially 0.35 to 0.75 weight fraction).
3) The anti-reflection film wherein the micro voids are contained in the range of 0.05 to 0.50 volume fraction (preferably 0.10 to 0.50 volume fraction) in the low refractive index layer.
4) The anti-reflection film wherein the particles are inorganic particles.
5) The anti-reflection film wherein the particles have a core-shell structure.
6) The anti-reflection film wherein the particles are treated with a silane-coupling agent.
7) The anti-reflection film wherein the fluorine-containing polymer is a homopolymer of perfluoro-2,2-dimethyl-1-dioxol or tetrafluoroethylene or a copolymer of these monomers.

8) The anti-reflection film which has a haze of 3 to 30%.

9) The anti-reflection film wherein the low refractive index layer is overlaid on a transparent film.

10) The anti-reflection film wherein the low refractive index layer has a thickness of 50 to 200 nm.

11) The anti-reflection film wherein each of the micro voids is closed with the binder polymer and the micro particles.

Further, there is provided by the invention an anti-reflection film comprising the low refractive index layer provided on a high refractive index layer having a refractive index higher than that of the low refractive index layer.

Furthermore, there is provided by the invention an anti-reflection film comprising the low refractive index layer provided on a high refractive index layer having a refractive index higher than that of the low refractive index layer, which is then provided on a middle refractive index layer having a refractive index between that of the low refractive index layer and that of the high refractive index layer.

The high refractive index layer provided with the low refractive index layer is preferably provided on a transparent film. The middle refractive index layer equipped with the low refractive index layer and the high refractive index layer is preferably provided on a transparent film.

Moreover, the invention provides an anti-reflection film comprising a low refractive index layer which has a refractive index of 1.20 to 1.40 and a thickness of 50 to 200 nm and is provided with micro voids of 0.02 to 0.28 volume fraction.

Furthermore, there is provided by the invention a display device provided with at least one anti-reflection film. The anti-reflection film is selected from the films described above.

The low refractive index layer of the anti-reflection film according to the invention is formed of a binder polymer and particles. Micro voids are formed by the particles. Each of the voids is preferably closed with the binder polymer and the particles. The low refractive index layer is a layer having refractive index lower than that of its material, and has an extremely low refractive index. Particularly, the anti-reflection film using the low refractive index layer together with at least one layers having high refractive index shows a high anti-reflection effect. The binder polymer has a function of adhering the particles to improve the mechanical strength of the low refractive index layer.

DETAILED DESCRIPTION OF THE INVENTION

The anti-reflection film of the invention comprises a low refractive index layer formed of fine particles and a polymer binder. The low refractive index layer has micro voids formed by superposing at least two particles one on another.

Figure 1:
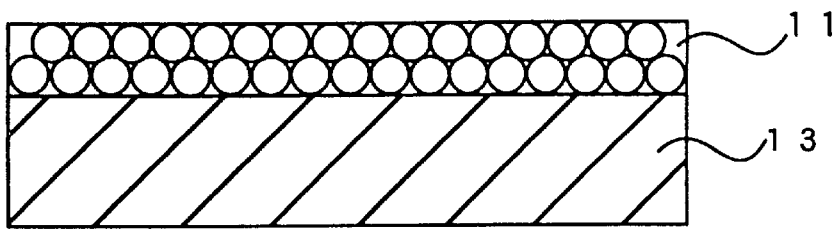
FIG. 1 is a cross-sectional view schematically showing a representative example of the anti-reflection film of the invention.

The representative example of the anti-reflection film of the invention is shown in FIG. 1. A low-refractive index layer 11 is formed on a transparent film (support) 13. The low refractive index layer 11 comprises particles and micro voids formed between the particles. In the low refractive index layer 11, at least two particles are superposed in the thickness direction, whereby the micro voids can be formed between the particles. Thus, the micro voids are generally arranged uniformly in the low refractive index layer 11.

The particles are bonded to each other by using a binder polymer (including a silane coupling agent). The low refractive index layer is generally formed on the surface of the transparent film or the surface of the top layer formed on the transparent film The particles are generally arranged in plane direction in the thickness of one particle to form one particle layer, and several particle layers are superposed to form the low-refractive layer of the invention. Therefore, the micro voids formed by the surrounding particles are generally formed uniformly in void size and in interval, because the sizes of the particles are almost the same one another.

Air on the low-refractive layer 11 has a refractive index of 1.00, while the particle generally has a refractive index of 1.25 to 1.45. The low-refractive layer 11 generally shows an intermediate value between a refractive index of air and that of the particle. Thus, the refractive index of the low refractive index layer 11 can be lowered by increasing the volume fraction of the micro voids through using fine particles and forming micro voids between the fine particles. The mean particle size of the particles generally is in the range of 5 to 200 nm, preferably 5 to 50 nm, and a thickness of the low-refractive layer generally is in the range of 50 to 400 nm, preferably 50 to 200 nm.

Figure 2:
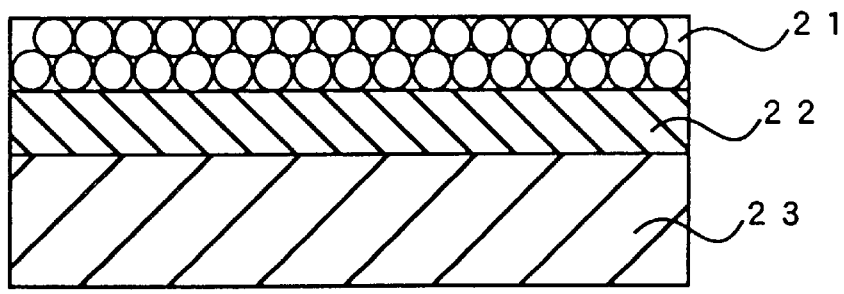
FIG. 2 is a cross-sectional view schematically showing another representative example of the anti-reflection film of the invention.

Another representative example of the anti-reflection film of the invention is shown in FIG. 2. A high refractive index layer 22 is formed on a transparent film 23, and a low refractive index layer 21 is formed on the high-refractive index layer 22. Increase of the number of layers constituting the anti-reflection film generally enlarges the wavelength region to which the anti-reflection film can apply. This is based on the principle of the multi-layered anti-reflection film using metal compounds.

In the anti-reflection film having the two layers, the high refractive index layer and the low refractive index layer generally satisfy the following conditions:

$$m\lambda/4 \times 0.7 < n_1 d_1 < m\lambda/4 \times 1.3 \quad (1)$$

$$n\lambda/4 \times 0.7 < n_2 d_2 < n\lambda/4 \times 1.3 \quad (2)$$

in which m represents a positive integer (generally 1, 2 or 3), $n_1$ represents a refractive index of the high refractive index layer, $d_1$ represents a thickness (nm) of the high refractive index layer, n represents a positive odd number (generally 1), $n_2$ represents a refractive index of the low refractive index layer, and $d_2$ represents a thickness (nm) of the low refractive index layer. The refractive index ($n_1$) of the high refractive index layer is higher by at least 0.05 than that of the transparent film, and the refractive index ($n_2$) of the low refractive index layer is lower by at least 0.1 than that of the high refractive index layer and lower by at least 0.05 than that of the transparent film. Further, $n_1$ generally is in the range of 1.5 to 1.7.

The above conditions (1) and (2) are well known formerly, and, for example, described in Japanese Patent Provisional Publication No. 59(1984)-50401.

Figure 3:
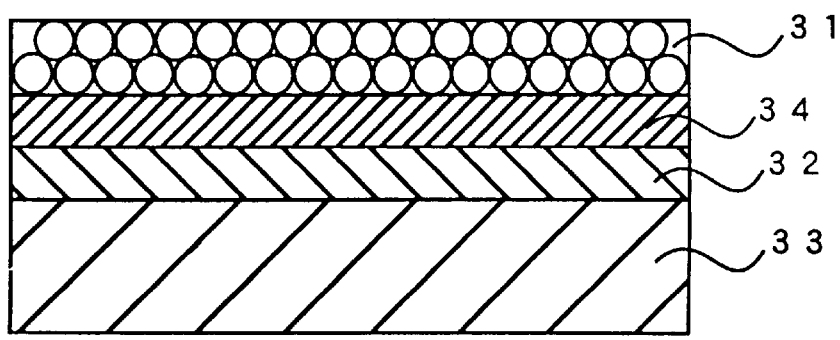
FIG. 3 is a cross-sectional view schematically showing other representative example of the anti-reflection film of the invention.

A further representative example of the anti-reflection film of the invention is shown in FIG. 3. A middle refractive index layer 32 is formed on a transparent film 33, a high refractive index layer 34 is formed on the intermediate-refractive index layer 32, and the low refractive index layer 31 is formed on the high-refractive index layer 34. The middle refractive index layer 32 has a refractive index between that of the high refractive index layer 34 and that of the low refractive index layer 31. The provision of anti-reflection film preferably shown in FIG. 3 further enlarges the wavelength region of light to which the anti-reflection film can apply, compared with the anti-reflection film shown in FIG. 2.

In the anti-reflection film having the three layers, the intermediate-, high- and low refractive index layers satisfy the following conditions:

$$h\lambda/4 \times 0.7 < n_3 d_3 < h\lambda/4 \times 1.3 \quad (3)$$

$$k\lambda/4 \times 0.7 < n_4 d_4 < k\lambda/4 \times 1.3 \quad (4)$$

$$j\lambda/4 \times 0.7 < n_5 d_5 < j\lambda/4 \times 1.3 \quad (5)$$

in which h represents a positive integer (generally 1, 2 or 3), $n_3$ represents a refractive index of the middle refractive index layer, $d_3$ represents a thickness (nm) of the middle refractive index layer; k represents a positive integer (generally 1, 2 or 3), $n_4$ represents a refractive index of the high refractive index layer, $d_4$ represents a thickness (nm) of the high refractive index layer; j represents a positive odd number (generally 1), $n_5$ represents a refractive index of the refractive index layer, and $d_5$ represents a thickness (nm) of the low refractive index layer. The refractive index of middle refractive index layer 32 generally is in the range of 1.5 to 1.7, and the refractive index of high refractive index layer 34 generally is in the range of 1.7 to 2.2.

Figure 4:
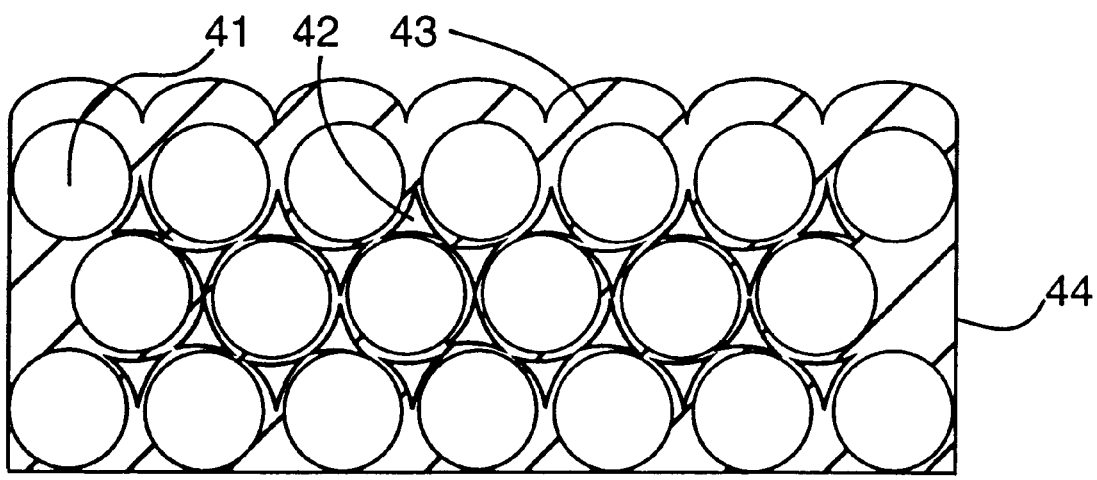
FIG. 4 is a cross-sectional view schematically showing a low refractive index layer.

FIG. 4 is a cross-sectional view schematically showing a low refractive index layer.

As is shown in FIG. 4, a low refractive index layer 4 has a porous structure. The micro particles 41 are so deposited to superpose at least one micro particles on another. Micro voids 42 are formed by superposing at least on particle on another micro particle. A polymer binder 43 adheres the micro particles 41 to keep the porous structure of the low refractive index layer 4. Each of the micro voids 42 is closed with the polymer binder 43 and the micro particles 41.

The micro particles used in the invention have a mean particle size of 5 to 200 nm, preferably 5 to 50 nm.

The amount of the micro particles is preferably in the range of 50 to 95 wt. %, more preferably in the range of 50 to 90 wt. %, and most preferably in the range of 50 to 80 wt. % based on the total amount of the low refractive index layer.

The micro particles can be made of fluororesin or an inorganic substance. Fluororesin particles and inorganic particles are described below.

[Fluororesin Particles]

The fluororesin particles are, for example, obtained from polymer latex of fluororesin. Increase of the particle size causes increase of scattering of light on the surface of the film. For example, when the particles of more than 200 nm are employed, scattered light is colored.

The fluororesin particles generally have glass transition temperature (Tg) of not lower than room temperature, preferably not lower than 100° C. (and generally is not higher than 200° C.). In the case that Tg of the fluororesin particles is lower than room temperature, the particles are deformed by excessive softening whereby micro voids disappear to increase the refractive index.

As the fluororesin particles, two or more kinds of fluororesin particles having Tg deferent from each other can be employed. The difference of Tg's of the fluororesin particles is generally not less than 5° C., preferably not less than 20° C.

The fluororesin particles of polymer latex, for example, have a structure comprising an inside portion (core) containing a large amount of the fluorine atom which is capable of lowering the refractive index, and an outside portion (shell) containing a relatively small amount of fluorine atoms which promotes adhesion between the particles or between the particles and the under layer (e.g., high refractive index layer, transparent film). The surface of the shell may have an acryloyl group or epoxy group thereon.

As the fluororesin of the particles, both crystalline fluororesin and amorphous fluororesin can be employed. Although a crystalline fluororesin generally lowers light transmittance, the crystalline fluororesin of the invention is employed in the form of extremely fine particle which is far small size compared with wavelength of light and therefore scarcely lowers the light transmittance. Thus, in the invention, the crystalline fluororesin can be employed for preparing the anti-reflection film.

Examples of the fluororesin include a homopolymer and copolymer formed from the following monomer:

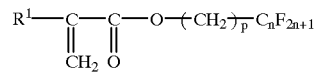

in which $R^1$ represents a hydrogen atom, a methyl group or a fluorine atom, and p and n independently represent an integer;

$CH_2\!=\!CHF$, $CH_2\!=\!CF_2$, $CF_2\!=\!CHF$, $CH_2\!=\!CH\!-\!C_nF_{2n+1}$ (n: an integer), $CF_2\!=\!CF\!-\!CF_2$ $CF_2\!=\!CF\!-\!O\!-\!C_nF_{2n+1}$ (n: an integer), $CF_2\!=\!CF\!-\!O\!-\!CF_2CF(CF_3)\!-\!O\!-\!CF_2CF_2COOCH_3$,

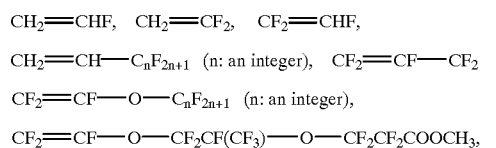

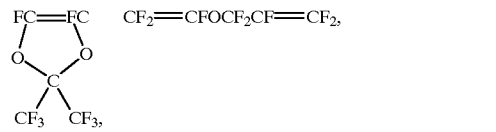

$CF_2\!=\!CFOCF_2CFCF\!=\!CF_2$,

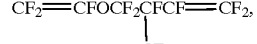

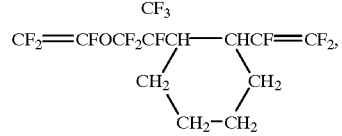

$CF_2\!=\!CFOCF_2OCF_2CF\!=\!CF_2$, $CF_2\!=\!CFOCF_2CF_2CH\!=\!CH_2$,

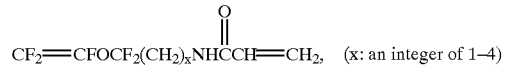

$CF_2\!=\!CFOCF_2CFCF_2CF\!=\!CF_2$, (x: an integer of 1–4)

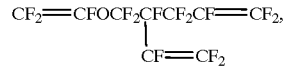

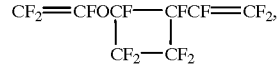

-continued $CF_2$=$CFOCF_2CF_2C$(CF$_3$)=$CF_2$,   $CF_2$=$CFO(CF_2)_2CF$=$CFCF_2$, $CF_2$=$CFOCF_2CF_2OCF$=$OFCl$, $CF_2$=$CFCNH$(O)$CH$(CF$_3$)$CH_2CH$=$CH_2$, $CF_2$=$CFCF_2CF_2CH$=$CH_2$,   $CF_2$=$CFCF_2CFCH$(CF$_3$)=$CH_2$, $CF_2$=$CHOCH_2CH_2CF$=$CF_2$, $CH_2$=$CFCOCH_2CH_2CF$=$CF_2$,
         ‖
         O $CF_2$=$CCOCH_2CH_2CF$(CF$_3$)=$CF_2$,
         ‖
         O $CH_2$=$CHOCH_2CH_2CF_2CF$=$CF_2$ and Examples of fluororesins prepared from the above monomers are follows:

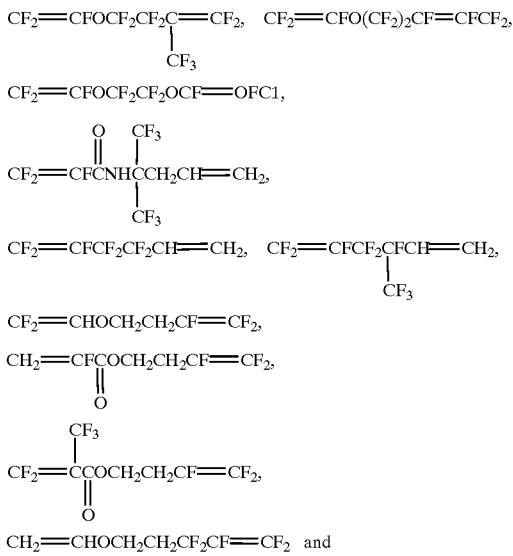

(l: an integer of 0–5, m: an integer of 0–4, n: an integer of 0–1, l+m+n: an integer of 1–6, R: F or $CF_2$),

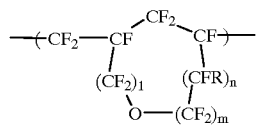

(o, p, q: an integer of 0–5, o+p+q: an integer of 1–6),

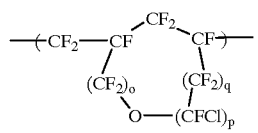

($R_1$, $R_2$: F or $CF_3$),

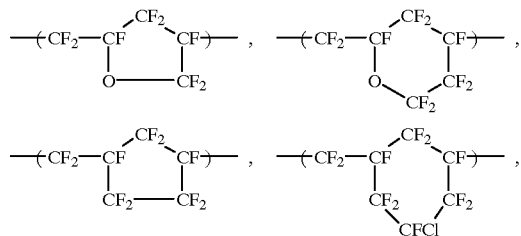

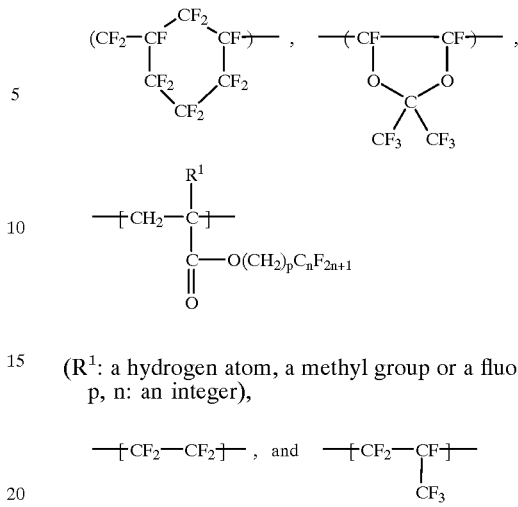

($R^1$: a hydrogen atom, a methyl group or a fluorine atom, p, n: an integer),

—$[CF_2$—$CF_2]$—,  and  —$[CF_2$—$CF(CF_3)]$—

The fluororesin preferably is a homopolymer of perfluoro-2,2-dimethyl-1-dioxol or tetrafluoroethylene or a copolymer of these monomers.

The refractive index of the fluororesin (fluorine-containing polymer) is linearly reduced in proportion to content of fluorine atom in the fluororesin, and the refractive index of the low refractive index layer (containing the fluororesin particles) is reduced proportional to increase of content of micro voids in the low refractive index layer. Thus, the refractive index of low refractive index layer can be lowered by increasing both the contents of fluorine atoms in the particles and the micro voids. Thus, to obtain the low refractive index layer having extremely low refractive index, the content of fluorine atom in the fluororesin generally is not less than 0.30 weight fraction, preferably is not less than 0.35 weight fraction, especially in the range of 0.35 to 0.75 weight fraction.

[Inorganic Particles]

Inorganic particles are preferably made of a metal oxide, a metal nitride, a metal sulfide or a metal halide, more preferably made of a metal oxide or a metal halide, and most preferably made of a metal oxide or a metal fluoride. The metal atom preferably is Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb or Ni, and more preferably is Mg, Ca, B or Si. The inorganic particles can be made of an inorganic substance containing two or more metal atoms.

The inorganic particles are most preferably made of a fluoride of an alkali metal (e.g., NaF, KF), a fluoride of an alkaline earth metal (e.g., $CaF_2$, $MgF_2$) or silicon dioxide ($SiO_2$).

The inorganic particles are preferably amorphous (not crystallized).

A dispersion of inorganic particles can be prepared by a sol-gel method (described in Japanese Patent Provisional Publication No. 53(1978)-112732, Japanese Patent Publication No. 57(1982)-9051) or a precipitation method (described in APPLIED OPTICS, 27, page 3356 (1988)). Further, powder of inorganic particles prepared by a drying and sedimentation method can be mechanically crushed to prepare a dispersion. Some inorganic particles (e.g., silicon dioxide sol) are commercially available.

The inorganic particles are preferably used in the form of a dispersion in an appropriate medium to form a low refractive index layer. Examples of the mediums include water, alcohols (e.g., methanol, ethanol, isopropyl alcohol) and ketones (e.g., methyl ethyl ketone, methyl isobutyl ketone).

[Surface Treatment]

The particles are preferably subjected to a surface treatment to improve an affinity with a polymer binder or a polymer shell. The surface treatment is classified into a physical treatment (e.g., plasma discharge treatment, corona discharge treatment) and a chemical treatment using a coupling agent. The particles are preferably subjected to a chemical treatment only, or to a combination of chemical and physical treatments.

The coupling agent preferably is an organoalkoxy metal compound (e.g., titanium coupling agent, silane coupling agent). In the case that particles are made of silicon dioxide, a surface treatment using a silane coupling agent is particularly effective.

A preferred silane coupling agent is represented by the following formula (Ia) or (Ib).

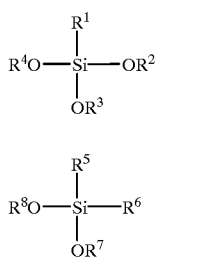

wherein each of $R^1$, $R^5$ and $R^6$ independently is an alkyl group having 1 to 10 carbon atoms, an aryl group having 1 to 10 carbon atoms, an alkenyl group having 2 to 10 carbon atoms, an alkynyl group having 2 to 10 carbon atoms or an aralkyl group having 7 to 10 carbon atoms, and each of $R^2$, $R^3$, $R^4$, $R^7$ and $R^8$ independently is an alkyl group having 1 to 6 carbon atoms or an acyl group having 2 to 6 carbon atoms.

In the formula (Ia) or (Ib), each of $R^1$, $R^5$ and $R^6$ preferably is an alkyl group, an aryl group, an alkenyl group or an aralkyl group, more preferably is an alkyl group, an aryl group or an alkenyl group, and most preferably is an alkyl group or an alkenyl group. The alkyl group, the aryl group, the alkenyl group, the alkynyl group and the aralkyl group may have a substituent group. Examples of the substituent groups include glycidyl, glycidyloxy, an alkoxy group, a halogen atom, an acyloxy group (e.g., acryloyloxy, methacryloyloxy), mercapto, amino, carboxyl, cyano, isocyanato and an alkenylsulfonyl group (e.g., vinylsulfonyl).

In the formula (Ia) or (Ib), each of $R^2$, $R^3$, $R^4$, $R^7$ and $R^8$ preferably is an alkyl group. The alkyl group may have a substituent group. Examples of the substituent groups include an alkoxy group.

The silane coupling agent preferably has a double bond in its molecule, which can be combined with a polymer binder by a reaction of the double bond. The double bond is preferably contained in $R^1$, $R^5$ or $R^6$ in the formula (Ia) or (Ib).

A more preferred silane coupling agent is represented by the following formula (IIa) or (IIb).

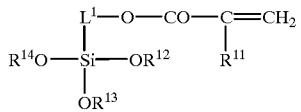

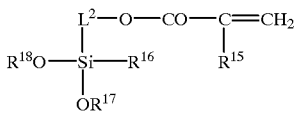

wherein each of $R^{11}$ and R15 independently is hydrogen or methyl, $R^{16}$ is an alkyl group having 1 to 10 carbon atoms, an aryl group having 1 to 10 carbon atoms, an alkenyl group having 2 to 10 carbon atoms, an alkynyl group having 2 to 10 carbon atoms or an aralkyl group having 7 to 10 carbon atoms, and each of $R^{12}$, $R^{13}$, $R^{14}$, $R^{17}$ and $R^{18}$ independently is an alkyl group having 1 to 6 carbon atoms or an acyl group having 2 to 6 carbon atoms.

In the formula (IIb), $R^{12}$, $R^{13}$, $R^{14}$, $R^{17}$ and $R^{18}$ have the same meanings as for $R^2$, $R^3$, $R^4$, $R^7$ and $R^8$ in the formula (Ia) or (Ib).

In the formula (IIa) or (IIb), R16 has the same meanings as for $R^1$, $R^5$ and $R^6$ in the formula (Ia) or (Ib). is an alkyl group having 1 to 6 carbon atoms or an acyl group having 2 to 6 carbon atoms.

Examples of the silane coupling agents represented by the formula (Ia) include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γglycidyloxypropyltriethoxysilane, γ-(β-glycidyloxyethoxy)propyltrimethoxysilane, β-(3,4-epoxycyclohexyl)ethyltrimethoxysilane, β-3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Silane coupling agents having a double bond in its molecule such as vinyltrimethoxysilane, vinyltriethoxysilane, vinyltriacetoxysilane, vinyltrimethoxyethoxysilane, γ-acryloyloxypropyltrimethoxysilane and γ-methacryloyloxypropyltrimethoxysilane are preferred. Silane coupling agents represented by the formula (IIa) such as γ-acryloyloxypropyltrimethoxysilane and γ-methacryloyloxypropyltrimethoxysilane are more preferred.

Examples of the silane coupling agents represented by the formula (Ib) include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldiethoxysilane, γ-methacryloyloxypropylmethyldimethoxysilane,
γ-mercaptopropylmethyldimethoxysilane,
γ-mercaptopropylmethyldiethoxysilane,
γ-aminopropylmethyldimethoxysilane,
γ-aminopropylmethyldiethoxysilane, methylvinyldimethoxysilane and methylvinyldiethoxysilane.

Silane coupling agents having a double bond in its molecule such as γ-acryloyloxypropylmethyldimethoxysilane, γ-acryloyloxypropylmethyldiethoxysilane, γ-methacryloyloxypropylmethyldiethoxysilane, γ-methacryloyloxypropylmethyldimethoxysilane, methylvinyldimethoxysilane and methylvinyldiethoxysilane are preferred. Silane coupling agents represented by the formula (IIb) such as γ-acryloyloxypropylmethyldimethoxysilane, γ-acryloyloxypropylmethyldiethoxysilane, γ-methacryloyloxypropylmethyldiethoxysilane and γ-methacryloyloxypropylmethyldimethoxysilane are more preferred.

Two or more silane coupling agents can be used in combination.

Another silane coupling agent can be used in combination with the silane coupling agent represented by the formula (Ia) or (Ib). Examples of the other coupling agents include an alkyl orthosilicate (e.g., methyl orthosilicate, ethyl orthosilicate, n-propyl orthosilicate, i-propyl orthosilicate, n-butyl orthosilicate, sec-butyl orthosilicate, t-butyl orthosilicate) and a hydrolyzed product thereof.

The surface treatment using a coupling agent can be conducted by adding the coupling agent to a dispersion of particles, and leaving the mixture at the room temperature to 60° C. for several hours to 10 days. An inorganic acid (e.g., sulfuric acid, hydrochloric acid, nitric acid, chromic acid, hypochlorous acid, boric acid, orthosilicic acid, phosphoric acid, carbonic acid), an organic acid (e.g., acetic acid, polyacrylic acid, benzenesulfonic acid, phenol, polyglutamic acid), or a salt thereof (e.g., metal salt, ammonium salt) can be added to the dispersion to accelerate the reaction of the surface treatment.

[Polymer Shell of Inorganic Particles]

Each of the inorganic particles can be covered with a polymer shell.

The polymer shell is preferably made of a polymer having a saturated hydrocarbon as a main chain. The shell polymer preferably contains fluorine atom in its main chain or side chain. The fluorine atom is preferably contained in the side chain of the polymer. The polymer preferably is polyacrylic ester or polymethacrylic ester, and more preferably is an ester of fluorine-containing alcohol with polyacrylic acid or polymethacrylic acid.

Examples of the fluorine-containing shell polymers are the same as the examples of the fluororesin used in the fluororesin particles.

The shell polymer may have a cross-linking functional group to form a cross-linking bond between the polymer shell and a polymer binder.

The amount of the polymer shell is preferably in the range of 10 to 95 wt. %, more preferably in the range of 10 to 85 wt. % based on the total amount of the core shell particles.

The polymer shell is formed on the inorganic particles preferably according to a radical polymerization method, such as an emulsion polymerization method or a dispersion polymerization method.

Examples of the polymerization initiators of the emulsion polymerization methods include inorganic peroxides (e.g., potassium persulfate, ammonium persulfate), azonitriles (e.g., 2,2'-azobis(2-methylpropionamide) hydrochloride), cyclic azoamidine compounds (e.g., 2,2'-azobis[2-(5-methyl-2-imidazoline-2-yl)propane hydrochloride), azoamide compounds (e.g., 2,2'-azobis{2-methyl-N-[1,1'-bis(hydroxymethyl)-2-hydroxyethyl]propionamide). Inorganic peroxides are preferred, and potassium persulfate and ammonium persulfate are more preferred.

Examples of the polymerization initiators of the dispersion polymerization methods include azo compounds (e.g., 2,2'-azobisisobutyronitrile, 2,2'-azobis(2,4-dimethylvaleronitrile), dimethyl-2,2'-azobis(2-methylpropionate), dimethyl-2,2'-azobisisobutyrate) and organic peroxides (e.g., lauryl peroxide, benzoyl peroxide, tert-butyl peroctoate).

The dispersion polymerization method is preferably conducted by adding a polymer dispersing agent to surface treated inorganic particles, and causing a polymerization reaction in a polymerization medium, which dissolves a monomer and a polymerization initiator, but does not dissolve a formed polymer.

Examples of the polymerization mediums include water, an alcohol (e.g., methanol, ethanol, propanol, isopropanol, 2-methoxy-1-propanol, butanol, t-butanol, pentanol, neopentanol, cyclohexanol, 1-methoxy-2-propanol), methyl ethyl ketone, acetonitrile, tetrahydrofuran and ethyl acetate. Water, methanol, ethanol and isopropanol are preferred. Two or more polymerization mediums can be used in combination.

[Micro Voids]

In the low refractive index layer, the content of micro voids generally is in the range of 0.05 to 0.50 volume fraction, preferably is in the range of 0.10 to 0.50 volume fraction, especially in the range of 0.10 to 0.28 volume fraction.

In the case that particles having monodispersed particle size are made closest packing, micro voids formed by the surrounding particles are 26% (0.26 volume fraction). Further, when the particles are made simple cubic packing, micro voids formed by the surrounding particles are 48% (0.48 volume fraction). In the practical system (i.e., the low refractive index layer), the particles have distribution range of particle size although the range is narrow and therefore the volume fraction of micro voids of the low refractive index layer shows somewhat different value from the above value. Further, the volume fraction of micro voids varies depending upon methods or conditions for forming the low refractive index layer (i.e., for bonding the particles).

When the volume fraction of micro voids is too high, mechanical strength of the low refractive index layer is lowered. Therefore, the volume fraction of micro voids of the low refractive index layer generally is not more than 0.50 volume fraction as mentioned above. In the case that a small amount of binder is employed, the volume fraction of micro voids varies depending on the ratio of the particles and the binder. Provided the micro voids formed between the particles have size of decades nm to several hundred nm (i.e., size of not larger than wavelength of light), a transparent layer having the aimed refractive index can be formed by selecting material in terms of refractive index and by adjusting the content of micro voids in the layer.

[Binder Polymer]

The binder is needed to be used so as not to fill up the micro voids. Examples of binder include water-soluble resins such as polyvinyl alcohol and polyoxyethylene; acrylic resins such as polymethyl acrylate and polymethyl acrylate; and cellulose derivatives such as nitrocellulose. In the case that the particles are dispersed in water, the water-soluble resins are employed as the binder. In the case that the particles are dispersed in organic solvent, preferred are resins (i.e., the above acrylic resins and cellulose derivatives) which can be soluble in the organic solvent and which has a strong affinity with the particles or the transparent film and a high transparence. Further, in the case that a polymerizable binder is employed as a binder for particles, the resultant layer of particles can be cross-linked by ultraviolet radiation or heating.

The polymerizable binder is preferably cross-linked. The cross-linked binder polymer can be synthesized by using a monomer having two or more ethylenically unsaturated groups.

Examples of the monomers include esters of polyhydric alcohol with (meth)acrylic acids (e.g., ethyleneglycol di(meth)acrylate, 1,4-dicyclohexane diacrylate, pentaerythrytol tetra(meth)acrylate, pentaerythrytol tri(meth)acrylate, trimethylolpropane tri(meth)acrylate, trimethylolethane tri(meth)acrylate, dipentaerythrytol penta(meth)acrylate, dipentaerythrytol hexa(meth)acrylate, 1,2,3-cyclohexane tetramethacrylate, polyurethane polyacrylate, polyester polyacrylate), vinyl benzene and its derivatives (e.g., 1,4-divinylbenzene, 2-acryloylethyl 4-vinylbenzoate, 1,4-divinylcyclohexanone), vinylsulfones (e.g., divinylsulfone) and acrylamides (e.g., methylenebisacrylamide) and methacrylamides.

The binder polymer is preferably synthesized by adding a monomer to a coating solution of the low refractive index layer and causing a polymerization reaction (if necessary and a cross-linking reaction) simultaneously with or after coating the solution. Examples of the polymerization initiators are the same as the initiators used in the synthesis of the shell polymer.

Two or more binder polymers can be used in combination.

The binder is generally employed in the minimum amount for enabling the bonding between the particles. The binder is preferably used in the amount of 5 to 25 weight % based on the total amount of the low refractive index layer.

[Anti-reflection Film]

The anti-reflection film generally comprises a support and the low refractive index layer thereon. The support generally is a transparent film. Examples of materials for the transparent film include cellulose derivatives (e.g., diacetyl cellulose, triacetyl cellulose, propionyl cellulose, butyryl cellulose and acetyl propionyl cellulose), polyamides, polycarbonates (e.g., those described in U.S. Pat. No. 3,023,101), polyesters (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate, and polyesters described in Japanese Patent Publication No. 48(1973)-40414), polystyrene (e.g., syndiotactic polystyrene), polyolefins (e.g., polypropylene, polyethylene and polymethylpentene), polymethyl methacrylate, polysulfone, polyethersulfone, polyarylate, polyether ketone, polyether imide and polyoxyethylene. Preferred are triacetyl cellulose, polycarbonate and polyethylene terephthalate.

The refractive index of the transparent film generally is in the range of 1.40 to 1.60.

In the case that the anti-reflection film is a multi-layered film, the low refractive index layer is employed together with one or more layers having higher refractive index than that of the low refractive index layer (e.g., high refractive index layer, middle refractive index layer mentioned previously).

Examples of materials for forming the layer having higher refractive index include organic materials such as thermoplastic resins (e.g., polystyrene, copolymers of styrene and other monomer polymerizable with styrene, polymer having an aromatic group, a heterocyclic group or a cycloalkyl or cycloalkenyl other than polystyrene, and polymers having a halogen atom other than fluorine atom), thermosetting resins (e.g., compositions containing as a hardener melamine resin, phenol resin or epoxy resin, compositions for forming polyurethane (e.g., combination of heterocyclic or aromatic polyisocyanate and polyol), and radical curable compositions containing resin or prepolymer modified by introducing a group having double bond into the above polymer or resin. The materials preferably have high film forming properties.

The layer having higher refractive index can be formed by using inorganic particles dispersed in an organic material. In this case, an organic material having refractive index lower than the above materials can be employed because the inorganic particles generally have high refractive index. Naturally, the combination of inorganic particles and organic material enables the formation of layer having refractive index higher than that of layer of the above organic material. Any organic materials are employable in the combination so long as they have transparence and are capable of dispersing the inorganic particles. Examples of the organic materials include the above materials, vinyl resins, acrylic resins, polyesters, alkyd resins, cellulose derivatives, urethane resins, and silicon compound substituted with an organic group; and hardeners used together with these resins.

The silicon compounds are generally compounds represented by the formula:

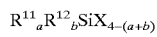

in which each of $R^{11}$ and $R^{12}$ independently represents an alkyl group, an alkenyl group, an allyl group or a hydrocarbon group substituted with halogen, epoxy, amino, mercapto, methacryloyl or cyano; X represents one hydrolysis group selected from the group consisting of an alkoxy group, an alkoxyalkoxy group, a halogen atom and an acyloxy group; each of a and b is 0, 1 or 2 provided a+b is 1 or 2; or hydrolysis products thereof.

Preferred examples of the inorganic compounds forming the inorganic particles include oxides of metals such as aluminum, titanium, zirconium and antimony. The inorganic compounds are available in the form of particle or dispersion in water and/or organic solvent. The inorganic compound (particles) is dispersed in the above organic material and employed for forming the layer having higher refractive index.

As materials for forming the layer having higher refractive index, further employable are the following inorganic materials which have film-forming properties and can be dispersed in solvent or are per se in liquid form. Examples of the inorganic materials include alkoxides of various elements, salts of organic acids, coordination compounds bonded to compound capable of forming coordination (e.g., chelate compounds), and activated inorganic polymers. Preferred examples of the inorganic materials include metal alkoxides such as titanium tetraethoxide, titanium tetraisopropoxide, titanium tetra-n-propoxide, titanium tetra-n-butoxide, titanium tetra-sec-butoxide, titanium tetra-tert-butoxide, aluminum triethoxide, aluminum triisopropoxide, aluminum tributoxide, antimony triethoxide, antimony tributoxide, zirconium tetraethoxide, zirconium tetraisopropoxide, zirconium tetra-n-propoxide, zirconium tetra-n-butoxide, zirconium tetra-sec-butoxide and zirconium tetra-tert-butoxide; chelate compounds such as diisopropoxytitanium-bis(acetylacetonate), dibutoxytitanium-bis(acetylacetonate), diethoxytitanium-bis (acetylacetonate), bis(acetylacetone)zirconium, aluminum acetylacetonate, aluminum di-n-butoxide monoethylacetylacetate, aluminum diisopropoxide monomethylacetoacetate and tri-n-butoxidezirconium monoethylacetoacetate; and activated inorganic polymers comprising main component of zirconyl carbonate ammonium or zirconium. Further, various alkylsilicates or hydrolysis products thereof, and fine silica particles (especially silica gel in colloidal state), although they have relatively low refractive index, can be employed in combination with the above inorganic materials.

The anti-reflection film of the invention can be so treated as to have anti-glare function (i.e., function scattering an incident light on the surface not to display a background view on the surface). For example, such an anti-reflection film can be prepared by the steps of forming unevenness on the surface of the support (transparent film) and forming an anti-reflection layer(s) such as the low refractive index layer on the surface. The formation of unevenness can be, for example, conducted by forming a layer containing inorganic or organic particles on the surface of the support. Otherwise, particles having particle size of 50 nm to 2 μm larger than that of the particles are incorporated into a coating liquid for forming the low refractive index layer in the amount of 0.1 to 50 weight % based on the amount of particles, whereby unevenness can be formed on the top surface of the anti-reflection film. The anti-reflection film having the anti-glare function has a haze preferably in the range of 3 to 30%, more preferably in the range of 5 to 20%, and most preferably in the range of 7 to 20%.

The anti-reflection film of the invention (preferably anti-reflection film having the anti-glare function) can be incorporated in a display device such as a liquid crystal display (LCD), a plasma display (PDP), an electroluminescence display (ELD) or a cathode ray tube display (CRT). In the display device provided with the anti-reflection film of the invention, displayed image is easily viewable.

In the case that the anti-reflection film has a support, the support is attached to the display surface of the display device.

The liquid crystal display provided with the anti-reflection film, for example, has the following structure:

A liquid crystal display comprising a liquid crystal cell which comprises a pair of substrates provided with a transparent electrode and nematic liquid crystal sealed therebetween, and a pair of polarizing sheets arranged on both sides of the cell; wherein at least one of the polarizing sheets is provided with the anti-reflection film thereon.

The low refractive index layer is, for example, formed by coating a coating liquid of the particles in solvent (e.g., water, organic solvent) on the transparent film or high or middle refractive index layer, and drying the coated layer. The coating is generally conducted using a coating machine such as bar coater, curtain coater, dip coater, spin coater or roll coater.

In the invention, an intermediate layer such as a hard coating layer, a moisture-proof layer or an antistatic layer can be provided on the support. Examples of materials for forming the hard coating layer include polymer such as acrylic resin, urethane resin or epoxy resin and/or oligomer and monomer (e.g., UV-curable resin); or material containing silicon.

REFERENCE EXAMPLE 1

Trifluoroethyl acrylate (trade name: Biscoat 3F, content of fluorine atom: 0.36 weight fraction, available from Osaka Organic Chemistry Co., Ltd.) was polymerized under emulsification to prepare a latex of fluororesin particles (mean particle size: 33 nm, refractive index: 1.405). A coating liquid of the latex dispersed in a mixture of water and methanol (9:1, by weight; solid content: 1 weight %) was coated using a spin coater on a triacetyl cellulose film (TAC film) at a temperature lower than Tg of the particles and dried at the temperature to form a low refractive index layer (thickness: 100 nm), whereby an anti-reflection film was obtained.

The resultant low refractive index layer showed a refractive index of 1.34, and micro voids of approx. 0.15 volume fraction. The refractive index of the low refractive index layer ($n_{layer}$) was determined from its reflectance (R) and refractive index of the TAC film ($n_{base}$) as follows:

$$n_{layer} = \sqrt{n_{base} \times \frac{1+\sqrt{R}}{1-\sqrt{R}}}$$

in which R represents reflectance of the low refractive index layer and $n_{base}$ represents refractive index of the TAC film (transparent film).

The volume fraction of micro voids was determined from the refractive index of the low refractive index layer ($n_{layer}$) and refractive index of the TAC film ($n_{base}$) as follows:

Volume fraction=$(n_{layer}-n_{base})/(1-n_{base})$

Further, the low refractive index layer was observed using electron microscope to confirm micro voids formed by superposing almost three particles upon one another.

Reflectance of the anti-reflection film (TAC film and low refractive index layer) showed 0.98% (reflectance of light of wavelength of 550 nm), while that of TAC film showed 3.75%.

REFERENCE EXAMPLE 2

Hexafluoroisopropyl methacrylate (trade name: Biscoat 6FM, content of fluorine atom: 0.48 weight fraction, available from Osaka Organic Chemistry Co., Ltd.) was polymerized under emulsification to prepare a latex of fluororesin particles (mean particle size: 30 nm, refractive index: 1.387). A coating liquid of the latex dispersed in a mixture of water and methanol (9:1, by weight; solid content: 1 weight %) was coated using a spin coater on a triacetyl cellulose film (TAC film) and dried at 40° C. to form a low refractive index layer (thickness: 100 nm), whereby an anti-reflection film was obtained.

The resultant low refractive index layer showed a refractive index of 1.30, and micro voids of approx. 0.23 volume fraction. The refractive index and volume fraction of micro voids were determined in the same manner as in Example 1. Further, the low refractive index layer was observed using electron microscope to confirm micro voids formed by superposing three particles upon one another.

Reflectance of the anti-reflection film (TAC film and low refractive index layer) showed 0.44% (reflectance of light of wavelength of 550 nm), while that of TAC film showed 3.75%.

REFERENCE EXAMPLE 3

A coating liquid of polystyrene (trade name: Torplex GPPS525-51, available from Mitsui Toatsu Chemicals, Inc.) in toluene (3 weight %) was coated using a spin coater on a triacetyl cellulose film (TAC film) at room temperature and dried at room temperature to form a high refractive index layer (refractive index: 1.585, thickness: 160 nm).

Perfluoro-2,2-dimethyl-1,3-dioxole (PDD) and tetrafluoroethylene (TFE) were polymerized under emulsification to prepare a latex of fluororesin particles (content of fluorine atom: approx. 0.60 weight fraction, mean particle size: 30 nm; refractive index: 1.310). A coating liquid of the latex dispersed in a mixture of water and methanol (9:1, by weight; solid content: 1 weight %) was coated using a spin coater on the high refractive index layer at room temperature and dried at room temperature to form a low refractive index layer (thickness: 100 nm), whereby an anti-reflection film was obtained.

The resultant low refractive index layer had a refractive index of 1.28, and micro voids of approx. 0.10 volume fraction. The refractive index and volume fraction of micro voids were determined in the same manner as in Example 1. Further, the low refractive index layer was observed using electron microscope to confirm micro voids formed by superposing three particles upon one another.

Reflectance of the anti-reflection film (TAC film and low refractive index layer) showed 0.19% (reflectance of light of wavelength of 550 nm), while that of TAC film showed 3.75%. Further, the anti-reflection film was equal to a film having two deposited layers of metal compounds (conventional multi-layered anti-reflection film) in anti-reflection effect.

EXAMPLE 1

A coating liquid of 25 weight parts of dipentaerythritol penta/hexaacrylate (trade name: DPHA, available from Nippon Kayaku Co., Ltd.), 25 weight parts of urethane acrylate oligomer (trade name: UV-6300B, available from Nippon Synthetic Chemical Industry Co., Ltd.), 2 parts of photopolymerization initiator (Irgacure-907, available from Ciba-Geigy) and 0.5 part of sensitizer (Kayacure-DETX, available from Nippon Kayaku Co., Ltd.) in 50 weight parts of methyl ethyl ketone, was coated using a spin coater on a triacetyl cellulose film (TAC film) and exposed to ultraviolet radiation to form a hard coating layer (thickness: 5

A coating liquid containing dispersion of $TiO_2$ particles and polymethyl methacrylate (refractive index: 1.48) as a binder ($TiO_2$/binder=22/78, by weight; solid content: 2 weight %) was coated on the hard coating layer and dried at 100° C. to form a middle refractive index layer (refractive index: 1.62, thickness: 78 nm).

A coating liquid containing dispersion of $TiO_2$ particles and the binder ($TiO_2$/binder=68/32, by weight; solid content: 2 weight %) was coated on the middle refractive index layer and dried at 100° C. to form an high refractive index layer (refractive index: 2.00, thickness: 127 nm).

Subsequently, a latex of fluororesin particles (mean particle size: 30 nm, refractive index: 1.387) prepared from hexafluoroisopropyl methacrylate (i.e., latex obtained in Example 2) and polyvinyl alcohol (refractive index: 1.50) as a binder were mixed to form a coating liquid (fluororesin particles/binder=84/16, by weight; solid content: 1 weight %). The coating liquid was coated using a spin coater on the high refractive index layer at 40° C. and dried at room temperature to form a low refractive index layer (thickness: 91 nm), whereby an anti-reflection film was obtained.

The resultant low refractive index layer had a refractive index of 1.400, and micro voids of approx. 0.10 volume fraction. The refractive index and volume fraction of micro voids were determined in the same manner as in Example 1. Further, the low refractive index layer was observed using electron microscope to confirm micro voids formed by superposing almost three particles upon one another.

The anti-reflection film was equal to a film having three physically deposited layers of metal compounds (conventional multi-layered anti-reflection film) in anti-reflection effect.

EXAMPLE 2

The procedures of Example 1 were repeated except for changing the triacetyl cellulose film to a polarizing plate having a surface subjected to anti-glare treatment (trade name: Sumicaran AG2, haze: 9%, available from Sumitomo Chemical Co., Ltd.) to form a polarizing plate having an anti-reflection film.

The polarizing plate was incorporated in a liquid crystal display (LCD). In the liquid crystal display, phenomenon of displaying a background view on the surface was greatly reduced and the displayed image was easily viewable.

SYNTHESIS EXAMPLE 1

Surface Treatment of Inorganic Particles

In a three neck flask of 500 ml having a stirring device, a thermometer and a reflux cooling tube, 300 ml of distilled water and 0.57 g of a 70 wt. % aqueous solution of sodium dioctyl sulfosuccinate were placed. The mixture was stirred. To the mixture while stirring, 90.0 g of 21.1 wt. % colloidal solution of magnesium fluoride (particle size: 30.5 nm) was gradually added. The reaction mixture was adjusted to pH 7.5 by using sulfuric acid. After the mixture was heated to 80° C. in nitrogen stream, 1.0 g of 3-methacryloyloxypropyltrimethoxysilane was added to the mixture. The resulting mixture was stirred for 4 hours to complete the surface treatment of the magnesium fluoride particles.

Formation of Polymer Shell

A solution of 0.128 g of potassium persulfate in 8 ml of distilled water (polymerization initiator solution) was added to the surface treated magnesium fluoride particles. Immediately, 4.5 g of hexafluoroisopropyl methacrylate (monomer) was dropwise added to the mixture for 3 hours. After the addition of the monomer, the polymerization initiator solution was added to the mixture again. The resulting mixture was stirred at 80° C. for 3 hours to complete the polymerization reaction.

The mixture was cooled to the room temperature, and filtered to obtain 415 g of a core-shell particle dispersion. The solid content was 6.0 wt. %, the average particle size was 40.2 nm, and the yield was 98%.

SYNTHESIS EXAMPLE 2

Surface Treatment of Inorganic Particles

In a four neck flask of 300 ml having a stirring device, a thermometer and a reflux cooling tube, 5 g of sodium dodecylbenzenesulfonate, 300 g of colloidal silica (ST-ZL, Nissan Chemical Co., Ltd., average particle size: 72 nm, solid content: 30 wt. %) and 74 ml of ion-exchanged water. The mixture was adjusted to pH 7.5 by using sulfuric acid, and stirred. After the mixture was heated to 60° C. in nitrogen stream, 10 g of 3-methacryloyloxypropyltrimethoxysilane was added to the mixture. The resulting mixture was stirred for 4 hours to complete the surface treatment of the silica particles.

Formation of Polymer Shell

To the surface treated silica particles, 0.5 g of ammonium persulfate and 0.2 g of sodium bisulfite were added. A mixture of 54 g of hexafluoroisopropyl methacrylate, 4.8 g of glycidyl methacrylate and 1.2 g of acrylic acid was dropwise added to the particles for 3 hours. The reaction temperature was kept at 60 to 70° C. The mixture was stirred for 2 hours at 60 to 70° C. The mixture was cooled, dialyzed through a membrane having the fraction molecular weight of 10,000 for 3 days, and filtered to obtain 757 g of a core-shell particle dispersion. The solid content was 20.3 wt. %, the average particle size was 81.3 nm, and the yield was 96%.

SYNTHESIS EXAMPLES 3 TO 7

Core-shell particles set forth in Table 1 were prepared according to an emulsion polymerization method, which is analogous to the Synthesis Examples 1 and 2. The following shell polymers (1) to (7) were synthesized in the Synthesis Examples 1 to 7 respectively.

(1) Polyhexafluoroisopropyl methacrylate
(2) Hexafluoroisopropyl methacrylate (90 weight parts)—glycidyl methacrylate (8 weight parts)—acrylic acid (2 weight parts) copolymer
(3) Hexafluoroisopropyl methacrylate (90 weight parts)—glycidyl methacrylate (10 weight parts) copolymer
(4) 1H,1H-pentadecafluorooctyl acrylate (95 weight parts)—2-hydroxyethyl methacrylate (5 weight parts) copolymer
(5) Hexafluoroisopropyl α-fluoroacrylate (90 weight parts)—2-hydroxyethyl acrylate (10 weight parts) copolymer
(6) Trifluoroethyl acrylate (80 weight parts)—glycidyl acrylate (20 weight parts) copolymer
(7) Hexafluoroisopropyl methacrylate (90 weight parts)—allyl methacrylate (10 weight parts) copolymer

TABLE 1

| Parti-cle No. | Core Compound | Core Size | C/S wt. ratio | Solid content | Particle size | Fluorine content |
|---|---|---|---|---|---|---|
| CS-1 | MgF$_2$ | 30.5 | 81/19 | 6.0 | 40.2 | 59.2 |
| CS-2 | SiO$_2$ | 72.0 | 60/40 | 20.3 | 81.3 | 18.6 |
| CS-3 | MgF$_2$ | 30.5 | 70/30 | 8.2 | 53.9 | 56.7 |
| CS-4 | SiO$_2$ | 72.0 | 50/50 | 12.6 | 92.0 | 29.8 |
| CS-5 | CaF$_2$ | 55.4 | 90/10 | 11.3 | 61.4 | 48.8 |
| CS-6 | CaF$_2$ | 55.4 | 82/18 | 6.2 | 67.9 | 45.2 |
| CS-7 | MgF$_2$ | 123.0 | 76/24 | 3.9 | 139.0 | 58.8 |

(Remark)
Core size and Particle size: nm
Solid content and Fluorine content: wt. %

EXAMPLE 3

To 90 weight parts of the core-shell particles CS-1 prepared in the Synthesis Example 1, 10 weight parts of polymethyl methacrylate latex was added to prepare a coating solution of a low refractive index layer.

The coating solution was coated on a triacetyl cellulose film by using a spin coater, and dried at 90° C. for 90 minutes to form a low refractive index layer (thickness: 100nm).

The refractive index, the void ratio, the reflectance within the visible region (the average reflectivity within the wavelength region of 400 to 800 nm) and the membrane mechanical strength was measured.

The void ratio (volume %) was calculated from the refractive index (measured) of the layer and the refractive index (calculated) of the components contained in the layer. Furthermore, the mechanical strength (surface hardness) of the layer was measured by using fingers, tissue paper and an eraser. The strength was evaluated as three grades A (not scratched with fingers, tissue paper or an eraser), B (scratched with an eraser), C (scratched with tissue paper), and D (scratched with fingers). The results are set forth in Table 2.

EXAMPLE 4 TO 11

Anti-reflection films were prepared in the same manner as in Example 3, except that the particles and the polymer binders set forth in Table 2 were used. The films were evaluated in the same manner as in Example 3. The results are set forth in Table 2.

TABLE 2

| Ex. No. | Particles No. | Ratio | Binder No. | Ratio | Re-fract | Re-flect | Strength | Void ratio |
|---|---|---|---|---|---|---|---|---|
| Ex. 3 | CS-1 | 90% | BP3 | 10% | 1.33 | 0.5% | A | 18% |
| Ex. 4 | CS-1 | 85% | BP1 | 15% | 1.32 | 0.3% | A | 14% |
| Ex. 5 | CS-3 | 90% | BP1 | 10% | 1.31 | 0.3% | A | 17% |
| Ex. 6 | CS-3 | 80% | BP3 | 20% | 1.32 | 0.5% | A | 11% |
| Ex. 7 | CS-2 | 75% | BP2 | 25% | 1.34 | 0.6% | A | 7% |
| Ex. 8 | CS-4 | 75% | BP2 | 25% | 1.33 | 0.4% | A | 5% |
| Ex. 9 | CS-5 | 75% | BP2 | 25% | 1.32 | 0.2% | A | 12% |
| Ex. 10 | CS-6 | 75% | BP2 | 25% | 1.33 | 0.4% | A | 9% |
| Ex. 11 | CS-7 | 75% | BP2 | 25% | 1.31 | 0.3% | A | 9% |

(Remark)
Ratio of particles and ratio of binder: wt. %
Void ratio: volume %
Refract: Refractive index
Reflect: Reflectance
BP1: Polyhexafluoroisopropyl methacrylate latex
BP2: Hexafluoroisopropyl methacrylate (91 weight parts) - divinylbenzene (9 weight parts) copolymer latex
BP3: Polymethyl methacrylate latex

EXAMPLE 12

Formation of Hard Coating Layer

A toluene solution containing 5 wt. % of dipentaerythrytol hexaacrylate, 0.5 wt. % of a photopolymerization initiator (Irgacure 907, Ciba-Geigy) and 0.2 wt. % of a photosensitizer (Kayacure DETX, Nippon Kayaku Co., Ltd.) was coated on a triacetyl cellulose film (thickness: 90 μm) by using a wire bar to form a hard coating layer (thickness: 8 μm). The coated layer was dried and heated to 100° C. An ultraviolet ray was irradiated to the layer by using a high pressure mercury lamp (12 W/cm) for 1 minute to harden the layer. The layer was cooled to the room temperature.

Formation of High Refractive Index Layer

With 100 g of an n-butyl methacrylate (80 weight parts)—methacrylic acid (20 weight parts) copolymer latex (average particle size: 71 nm, solid content: 12.5 wt. %), 25 g of tin oxide fine particles (Ishiwara Industries) were mixed. In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to the mixture, and the resulting mixture was stirred to form a coating solution.

The coating solution was coated on the hard coating layer by using a wire bar to form a high refractive index layer (thickness: 0.16 μm). The coated layer was dried and heated to 100° C. An ultraviolet ray was irradiated to the layer by using a high pressure mercury lamp (12 W/cm) for 1 minute to harden the layer. The layer was cooled to the room temperature.

Formation of Low Refractive Index Layer

In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to 100 g of the particles CS-1 prepared in the Synthesis Example 1, and the resulting mixture was stirred to form a coating solution.

The coating solution was coated on the high refractive index layer by using a wire bar to form a high refractive index layer (thickness: 0.10 $\mu$m). The coated layer was dried and heated to 100° C. An ultraviolet ray was irradiated to the layer by using a high pressure mercury lamp (12 W/cm) for 1 minute to harden the layer. The layer was cooled to the room temperature.

The average reflectance within the visible region (400 to 800 nm) of the obtained film was measured. Further, the mechanical strength (surface hardness) of the layer was measured and evaluated in the same manner as in Example 3. The average reflectance was 0.3%, and the strength was evaluated as A.

EXAMPLES 13 TO 17

Anti-reflection films were prepared and evaluated in the same manner as in Example 12, except that the particles for the low refractive index layer and the polymer for the high refractive index layer set forth in Table 3 were used. The coating solution was so adjusted that the solid contents of the coating solutions were the same as those of the coating solutions in Example 12. The results are set forth in Table 3.

TABLE 3

| Sample No. | High refractive Polymer | Index | Low layer Particles | Reflectance | Surface strength |
|---|---|---|---|---|---|
| Ex. 12 | HP1 | 1.55 | CS-1 | 0.3% | A |
| Ex. 13 | HP2 | 1.57 | CS-3 | 0.3% | A |
| Ex. 14 | HP3 | 1.59 | CS-3 | 0.2% | A |
| Ex. 15 | HP2 | 1.57 | CS-4 | 0.4% | A |
| Ex. 16 | HP1 | 1.55 | CS-5 | 0.2% | A |
| Ex. 17 | HP3 | 1.59 | CS-7 | 0.3% | A |

(Remark)
HP1: n-Butyl methacrylate (80 weight parts) - methacrylic acid (20 weight parts) copolymer
HP2: Methyl methacrylate (65 weight parts) - ethyl methacrylate (25 weight parts) - glycidyl methacrylate (10 weight parts) copolymer
HP3: Benzyl methacrylate (50 weight parts) - methyl methacrylate (25 weight parts) - allyl methacrylate (20 weight parts) - methacrylic acid (5 weight parts) copolymer

EXAMPLE 18

The anti-reflection film prepared in Example 13 was attached to a display surface of a liquid crystal display of a personal computer (PC9821NS/340W, Nippon Electric Co., Ltd.). As a result, the phenomenon of displaying a background view on the surface was greatly reduced, and the displayed image was easily observed.

EXAMPLE 19

The anti-reflection film prepared in Example 14 was attached to a display surface of a liquid crystal display of a personal computer (PC9821NS/340W, Nippon Electric Co., Ltd.). As a result, the phenomenon of displaying a background view on the surface was greatly reduced, and the displayed image was easily observed.

EXAMPLE 20

The anti-reflection film prepared in Example 16 was attached to a display surface of a liquid crystal display of a personal computer (PC9821NS/340W, Nippon Electric Co., Ltd.). As a result, the phenomenon of displaying a background view on the surface was greatly reduced, and the displayed image was easily observed.

EXAMPLE 21

Formation of Hard Coating Layer

In 439 g of industrial denatured ethanol, 125 of a mixture of dipentaerythritol pentaacrylate and dipentaerythritol hexaacrylate (DPHA, Nippon Kayaku Co., Ltd.) and 125 g of an urethane acrylate oligomer (UV-6300B, Nippon Synthetic Chemical Industry Co., Ltd.). A solution of 7.5 g of a photopolymerization initiator (Irgacure 907, Ciba-Geigy) and 5.0 g of a photosensitizer (Kayacure DETX, Nippon Kayaku Co., Ltd.) in 49 g of methyl ethyl ketone was added to the ethanol solution. The mixture was stirred and filtered through a filter having a mesh of 1 $\mu$m to prepare a coating solution of a hard coating layer.

A gelatin undercoating layer was formed on a triacetyl cellulose film having the thickness of 80 $\mu$m (TAC-TD80V, Fuji Photo Film Co., Ltd.). The coating solution of the hard coating layer was coated on the gelatin undercoating layer by using a bar coater, and dried at 120° C. An ultraviolet ray was irradiated to the layer to harden the layer. Thus a hard coating layer (thickness: 7.5 $\mu$m) was formed.

Preparation of Coating Solution of Low Refractive Index Layer

To 200 g of a methanol dispersion of silica fine particles (R507, Nissan Chemical Industries, Ltd.), 10 g of silane coupling agent (KBN-803, Shinetsu Silicone Co., Ltd.) and 2 g of 0.1 N hydrochloric acid. The mixture was stirred at the room temperature for 5 hours, and left at the room temperature for about 6 days to prepare a silica particle dispersion treated with the silane coupling agent.

To 149 g of the dispersion, 789 g of isopropanol and 450 g of methanol were added. A solution of 3.21 g of a photopolymerization initiator (Irgacure 907, Ciba-Geigy) and 1.605 g of a photosensitizer (Kayacure DETX, Nippon Kayaku Co., Ltd.) in 31.62 g of isopropanol was added to the dispersion. A solution of 2.17 g of a mixture of dipentaerythrytol pentaacrylate and dipentaerythrytol hexaacrylate (DPHA, Nippon Kayaku Co., Ltd.) in 78.13 g of isopropyl alcohol was further added to the dispersion. The mixture was stirred at the room temperature for 20 minutes, and filtered through a filter having a mesh of 1 $\mu$m to prepare a coating solution of a low refractive index layer.

Preparation of Anti-reflection Film

The coating solution of the low refractive index layer was coated on the hard coating layer by using a bar coater, and dried at 120° C. An ultraviolet ray was irradiated to the layer to harden the layer. Thus a low refractive index layer (thickness: 0.1 $\mu$m) was formed.

The average reflectance (within the wavelength region of 450 to 650 nm) and the pencil hardness of the prepared anti-reflection film were measured. The results are set forth in Table 4.

EXAMPLE 22

A gelatin undercoating layer was formed on a polyethylene terephthalate film having the thickness of 100 $\mu$m. The coating solution of the hard coating layer used in Example 21 was coated on the gelatin undercoating layer by using a bar coater, and dried at 120° C. An ultraviolet ray was irradiated to the layer to harden the layer. Thus a hard coating layer (thickness: 7.5 $\mu$m) was formed.

A low refractive index layer was formed on the hard coating layer in the same manner as in Example 21 to prepare an anti-reflection film.

The average reflectance (within the wavelength region of 450 to 650 nm) and the pencil hardness of the prepared anti-reflection film were measured. The results are set forth in Table 4.

EXAMPLE 23

A syndiotactic polystyrene film having the thickness of 100 μm was subjected to a glow discharge treatment. The coating solution of the hard coating layer used in Example 21 was coated on the treated surface by using a bar coater, and dried at 120° C. An ultraviolet ray was irradiated to the layer to harden the layer. Thus a hard coating layer (thickness: 7.5 μm) was formed.

A low refractive index layer was formed on the hard coating layer in the same manner as in Example 21 to prepare an anti-reflection film.

The average reflectance (within the wavelength region of 450 to 650 nm) and the pencil hardness of the prepared anti-reflection film were measured. The results are set forth in Table 4.

TABLE 4

| Sample No. | Support (refractive index) | Void ratio | Reflectance | Pencil hardness |
| --- | --- | --- | --- | --- |
| Ex. 21 | TAC (1.48) | 14 vol. % | 1.5% | 2 H |
| Ex. 22 | PET (1.66) | 14 vol. % | 1.3% | 2 H |
| Ex. 23 | Polystyrene (1.58) | 14 vol. % | 1.4% | 2 H |

(Remark)
TAC: Triacetyl cellulose
PET: Polyethylene terephthalate

EXAMPLE 24

Preparation of Titanium Dioxide Dispersion

To 30 weight parts of titanium dioxide (weight average primary particle size: 50 nm, refractive index: 2.70), 3 weight parts of the following anionic monomer (1), 3 weight parts of the following anionic monomer (2), 1 weight part of the following cationic monomer and 63 weight parts of methyl ethyl ketone were added. The mixture was stirred by using a sand grinder to prepare a titanium dioxide dispersion.

Anionic monomer (1)

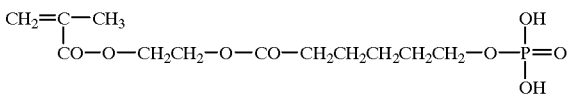

Anionic monomer (2)

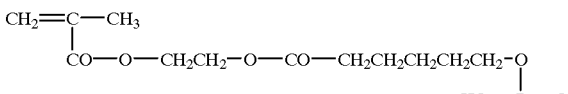

Cationic monomer (3)

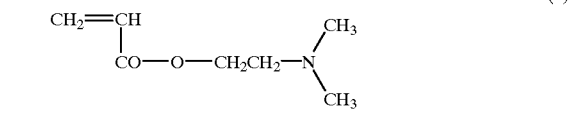

Preparation of Coating Solution of Middle Refractive Index Layer

In 172 g of cyclohexanone and 43 g of methyl ethyl ketone, 0.18 g of a photopolymerization initiator (Irgacure 907, Ciba-Geigy) and 0.059 g of a photosensitizer (Kayacure DETX, Nippon Kayaku Co., Ltd.) were dissolved. To the solution, 15.8 g of the titanium dioxide dispersion and 3.1 g of a mixture of dipentaerythrytol pentaacrylate and dipentaerythrytol hexaacrylate (DPHA, Nippon Kayaku Co., Ltd.) were added. The mixture was stirred at the room temperature for 30 minutes, and filtered through a filter having a mesh of 1 μm to prepare a coating solution of a middle refractive index layer.

Preparation of Coating Solution of High Refractive Index Layer

In 183 g of cyclohexanone and 46 g of methyl ethyl ketone, 0.085 g of a photopolymerization initiator (Irgacure 907, Ciba-Geigy) and 0.028 g of a photosensitizer (Kayacure DETX, Nippon Kayaku Co., Ltd.) were dissolved. To the solution, 17.9 g of the titanium dioxide dispersion and 1.0 g of a mixture of dipentaerythrytol pentaacrylate and dipentaerythrytol hexaacrylate (DPHA, Nippon Kayaku Co., Ltd.) were added. The mixture was stirred at the room temperature for 30 minutes, and filtered through a filter having a mesh of 1 μm to prepare a coating solution of a high refractive index layer.

Preparation of Anti-reflection Film

The coating solution of the middle refractive index layer was coated on the hard coating layer formed in Example 21 by using a bar coater, and dried at 120° C. An ultraviolet ray was irradiated to the layer to harden the layer. Thus a middle refractive index layer (thickness: 0.081 μm) was formed.

The coating solution of the high refractive index layer was coated on the middle refractive index layer by using a bar coater, and dried at 120° C. An ultraviolet ray was irradiated to the layer to harden the layer. Thus a high refractive index layer (thickness: 0.053 μm) was formed.

The coating solution of the low refractive index layer used in Example 21 was coated on the high refractive index layer by using a bar coater, and dried at 1200C. An ultraviolet ray was irradiated to the layer to harden the layer. Thus a low refractive index layer (thickness: 0.092 μm) was formed.

The average reflectance within the wavelength region of 450 to 650 nm and the pencil hardness of the prepared anti-reflection film were measured. Further, the contact angle was measured to evaluate resistance to finger print mark. The results are set forth in Table 5.

EXAMPLE 25

The middle refractive index layer, the high refractive index layer and the low refractive index layer were formed on the hard coating layer in the same manner as in Example 24, except that the thickness of the low refractive index layer was 0.072 μm. A solution of a cross-linkable fluorine containing polymer was coated on the low refractive index layer, and heated at 120° C. to cross-link the fluorine containing polymer. Thus a protective layer (thickness: 0.02 μm).

The average reflectance within the wavelength region of 450 to 650 nm and the pencil hardness of the prepared anti-reflection film were measured. Further, the contact angle was measured to evaluate resistance to finger print mark. The results are set forth in Table 5.

TABLE 5

| Sample No. | Protective layer | Reflectance | Pencil hardness | Contact angle |
|---|---|---|---|---|
| Example 24 | None | 0.35% | 2 H | 106° |
| Example 25 | Provided | 0.36% | 2 H | 28° |

We claim:

1. A process for the preparation of an anti-reflection film, which comprises the steps of: coating a liquid comprising a polymer binder and micro particles on a transparent film, wherein the polymer binder is synthesized by using an ester of a polyhydric alcohol with a (meth)acrylic acid, whereby micro particles are so deposited to superpose at least one micro particle on another micro particle, to form micro voids surrounded by the micro particles, said micro particles having a mean particle size of 5 to 200 nm, and said polymer binder being contained in an amount of 5 to 25 weight % based on the total amount of the coated layer; and drying the coated layer to form a low refractive index layer.

2. The process as defined in claim 1, wherein the micro voids are formed in an amount of 0.05 to 0.50 volume fraction in the low refractive index layer.

3. The process as defined in claim 1, wherein the film has a haze of 3 to 30%.

4. The process as defined in claim 1, wherein the particles have a core-shell structure.

5. The process as defined in claim 1, wherein the particles are treated with a silane-coupling agent.

6. The process as defined in claim 1, wherein the low refractive index layer has a refractive index of 1.20 to 1.40.

7. The process as defined in claim 1, wherein the micro particles are made of a fluorine-containing polymer.

8. The process as defined in claim 2, wherein the fluorine-containing polymer is a crystalline polymer.

9. The process as defined in claim 2, wherein the fluorine-containing polymer contains a fluorine atom in an amount of not less than 0.30 weight fraction.

10. The process as defined in claim 2, wherein the fluorine-containing polymer is a homopolymer of perfluoro-2,2-dimethyl-1-dioxol or tetrafluoroethylene or a copolymer of them.

11. The process as defined in claim 1, wherein the micro particles are inorganic particles.

12. The process as defined in claim 1, wherein the inorganic particles are made of a metal fluoride or a metal oxide.

13. The process as defined in claim 1, wherein each of the inorganic particles is covered with a polymer shell.

14. The process as defined in claim 1, wherein each of the micro voids is closed with the binder polymer and the micro particles in the low-refractive index layer.

15. A display device provided with at least one anti-reflection film prepared according to the process of claim 1.

16. A process for the preparation of an anti-reflection film, which comprises the steps of: coating a liquid comprising a polymer binder and micro particles on a high refractive index layer, wherein the polymer binder is synthesized by using an ester of a polyhydric alcohol with a (meth)acrylic acid, whereby micro particles are so deposited to superpose at least one micro particle on another micro particle, to form micro voids surrounded by the micro particles, said micro particles having a mean particle size of 5 to 200 nm, and said polymer binder being contained in an amount of 5 to 25 weight % based on the total amount of the coated layer; and drying the coated layer to form a low refractive index layer, said high refractive index layer having a refractive index higher than that of said low refractive index layer.

17. The process as defined in claim 16, wherein the micro voids are formed in an amount of 0.05 to 0.50 volume fraction in the low refractive index layer.

18. The process as defined in claim 16, wherein the micro particles are made of a fluorine-containing polmer.

19. The process as defined in claim 18, wherein the fluorine-containing polymer contains a fluorine atom in an amount of not less than 0.30 weight fraction.

20. The process as defined in claim 16, wherein the micro particles are inorganic particle.

21. A display device provided with at least one anti-reflection film prepared according to the process of claim 16.

22. A process for the preparation of an anti-reflection film, which comprises the steps of: coating a liquid comprising a polymer binder and micro particles on a high refractive index layer provided on a middle refractive index layer, wherein the polymer binder is synthesized by using an ester of a polyhydric alcohol with a (meth)acrylic acid, whereby micro particles are so deposited to superpose at least one micro particle on another micro particle, to form micro voids surrounded by the micro particles, said micro particles having a mean particle size of 5 to 200 nm, and said polymer binder being contained in an amount of 5 to 25 weight % based on the total amount of the coated layer; and drying the coated layer to form a low refractive index layer, said high refractive index layer having a refractive index higher than that of said low refractive index layer, and said middle refractive index layer having a refractive index between that of the low refractive index layer and that of the high refractive index layer.

23. The process as defined in claim 22, wherein the micro voids are formed in an amount of 0.05 to 0.50 volume fraction in the low refractive index layer.

24. The process as defined in claim 22, wherein the micro particles are made of a fluorine-containing polymer.

25. The process as defined in claim 24, wherein the fluorine-containing polymer contains a fluorine atom in the amount of not less than 0.35 weight fraction.

26. The process as defined in claim 22, wherein the micro particles are inorganic particles.

27. A display device provided with at least one anti-reflection film prepared according to the process of claim 22.

* * * * *